United States Patent

Winfree et al.

[15] 3,685,762
[45] Aug. 22, 1972

[54] SPINNING REEL

[72] Inventors: Virginia R. Winfree; Louise W. Winfree; Jack W. Winfree, all of 321 Rutledge Drive, South Daytona, Fla. 32019

[22] Filed: July 8, 1969

[21] Appl. No.: 839,895

[52] U.S. Cl. ............................................. 242/84.2
[51] Int. Cl. ............................................. A01k 89/00
[58] Field of Search ......... 242/84.2 D, 84.2 B, 84.2 J, 242/84.2, 84.1, 84.2 A, 84.21 A, 84.21 R

[56] References Cited

UNITED STATES PATENTS

| 3,105,650 | 10/1963 | Kuether | 242/84.2 A |
|---|---|---|---|
| 3,437,282 | 4/1969 | Honkonen et al. | 242/84.21 R |
| 3,296,731 | 1/1967 | Wood | 242/84.21 A |
| 599,138 | 2/1898 | Boyle | 242/84.3 |
| 2,590,369 | 3/1952 | Beeler | 242/84.2 D |
| 3,379,391 | 4/1968 | Fincannon | 242/84.2 D |

FOREIGN PATENTS OR APPLICATIONS

| 859,236 | 6/1940 | France | 242/84.2 D |
|---|---|---|---|
| 985,980 | 3/1951 | France | 242/84.2 B |
| 8,517 | 1910 | Great Britain | 242/84.2 D |
| 583,350 | 12/1946 | Great Britain | 242/84.2 B |

*Primary Examiner*—Billy S. Taylor
*Attorney*—John J. Byrne

[57] ABSTRACT

A device for paying out and hauling in a fishing line wherein the improvement comprises improved means for guiding the line during the pay-out such that the necessity of reel rotation is eliminated. This is accomplished by way of a two-position ball or guide having a first position in a plane transverse to the axis of rotation of said reel and a pay-out or casting position wherein a guide loop part of said bail directs the fishing line outwardly along an extension of the reel axis whereby said line is payed out without reel rotation.

3 Claims, 4 Drawing Figures

PATENTED AUG 22 1972

INVENTORS
VIRGINIA R. WINFREE
LOUISE W. WINFREE
JACK W. WINFREE
BY John J. Byrne
ATTORNEY

SPINNING REEL

The principal objective of this invention is to provide a guide means for the line of a fishing reel whereby a guide selectively causes payout of the line without reel rotation.

Another objective of this invention is to provide the above advantage with rugged and simple means for permitting haul-in or pay-out of the fishing line in a conventional reel rotation manner.

A still further objective of this invention is to provide a spinning reel of the type described wherein an improved guide bail is provided to insure that the line is directed outwardly from the periphery of the reel a relatively long distance along an extension of the axis of rotation of the reel whereby the lines will leave the reel in a peripheral fashion.

These and other objects of the invention will become more apparent to those skilled in the art by reference to the following description when viewed in light of the accompanying drawings wherein.

Figure 1:
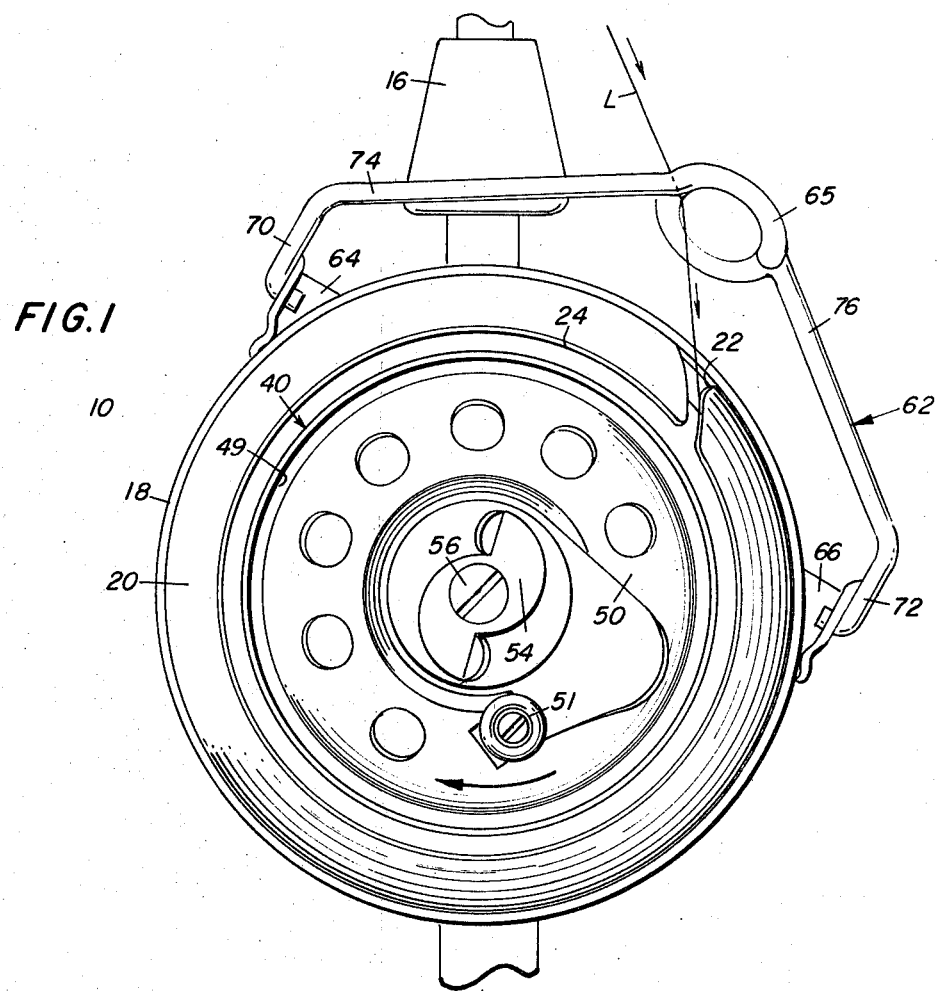
FIG. 1 is a top plan view of the reel with the guide means in its reel-in position.

Referring now to the drawings wherein like numerals indicate like parts, the numeral 10 generally indicates the spinning reel of this invention. The construction of the reel 10 can best be understood with reference to FIGS. 3 and 4. The reel is formed with a base member 12 to which a bracket member 14 is affixed. The bracket member 14 is of conventional design and is adapted to secure the reel to a fishing rod 16. The reel is affixed to the rod in a manner best illustrated by the plan view of FIG. 1. The base 12 is formed with an upwardly extending lip 18 about its periphery which snugly receives an annular shroud member 20. The shroud is affixed to lift 18 by any securing device such as indentations, rivets or welds. The shroud 20 is formed with a line feed-out aperture 22. Note that shroud 20 is arcuate in cross-section and is directed inwardly to form a large opening as defined by its smooth and rounded periphery 24.

The bracket 14 is formed with a counterbore 26 to receive the lower end of a shaft 28. Intermediate its length, the shaft 28 is formed with a flange 30 which rests upon the inner surface of bracket 14. The shaft 28 is threaded at its lower end to receive a screw 31 whereby the shaft is rigidly attached to bracket 14. A bearing sleeve 32 slips over the shaft 28 and is formed with a lower flange 34 that rests on the upper surface of the flange 30. About its outer lower surface, the flange 34 is formed with teeth 36 for purposes hereinafter described.

Disposed on the upper surface of flange 34 is a drag washer 38. Disposed over the drag washer is a reel assembly 40. The reel assembly includes upper and lower plates 42 and 44 which are stabilized by a plurality of struts 46 therebetween. The reel has an inner opening 48 which is rotatably received about the sleeve 32. A second drag washer 49 is disposed between the reel and a crank bell member 50. The bell crank is keyed to sleeve 32 for rotation therewith. The bell is held in place by a wing nut 54. A bolt 56 draws the crank and the flange toward the reel 40 and the drag washers create sufficient friction so that these members rotate with the reel.

There is described above a spinning reel which has a stationary housing comprised of the base 12, the shroud 20 which receives the rotatable reel assembly. As is conventional, the reel receives a wound line L about the struts. The line is fed through the shroud aperture to the end of the fishing pole. The fishing pole is formed of loops throughout its length which act as guides for the fishing line.

In the present invention, a guide member 62 is pivotally secured to the base plate 12 at ears 64 and 66. The guide member is turned in at its ends so as to be received by apertures in the ears 64 and 66. The spring action of the guide member maintains these turned-in portions in place. The ears are also each formed with a pair of depressions, one of which locates the guide in a plane generally transverse to the reel as shown in FIG. 1 and a second of which where another depression locates the guide member in a casting position. In the latter position a loop 65 is disposed over the axis of rotation of the reel. This guides the line outwardly from the reel. Leg portions 70 and 72 extend from the turned-in portions. Inwardly extending arms 74 and 76 lead to the guide loop 65. Arms 74 and 76 together with legs 70 and 72 guide the line through the smooth passageway 24 formed in the shroud member to a direction outwardly and axially to the reel direction of rotation. The line is fed peripherally off the reel without a rotation thereof when the bail is in the casting position. Note that the upper member 44 of the reel assembly is inwardly turned at 49 for ease of feeding when the guide is in the casting position.

Figure 2:
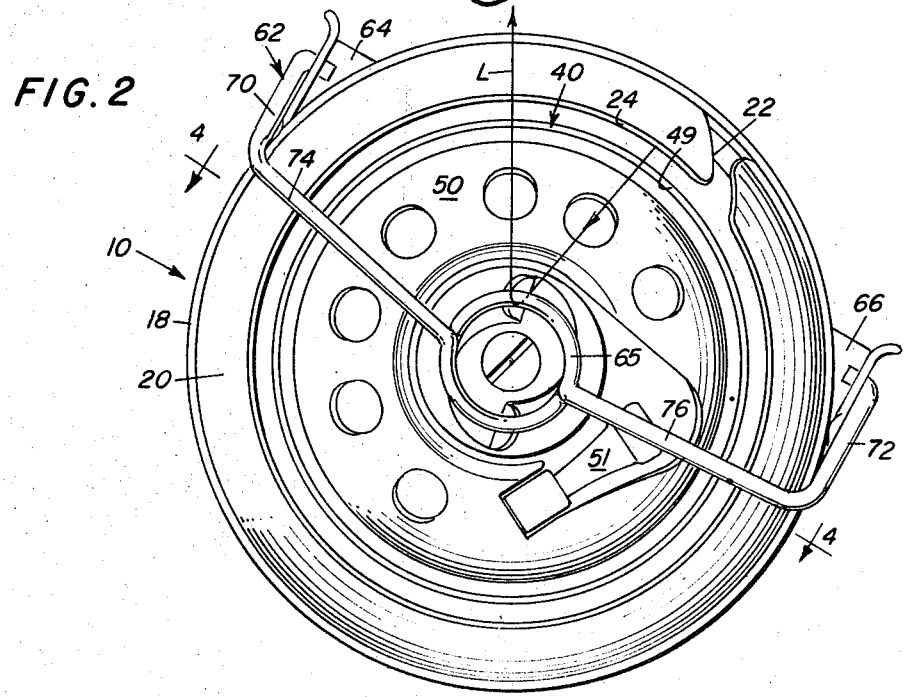
FIG. 2 is a plan view with the guide means in its casting position.
Figure 3:
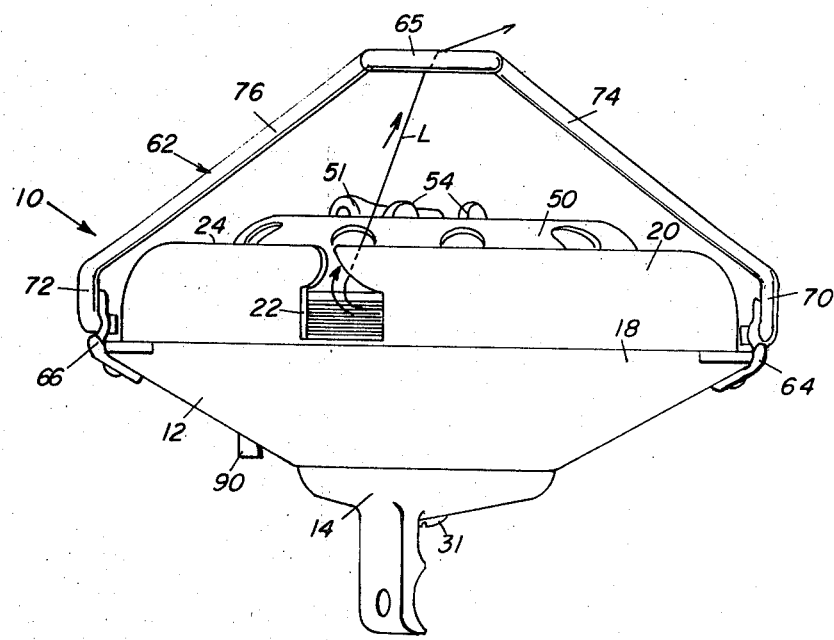
FIG. 3 is an elevation taken in the direction of 3—3 of FIG. 2.
Figure 4:
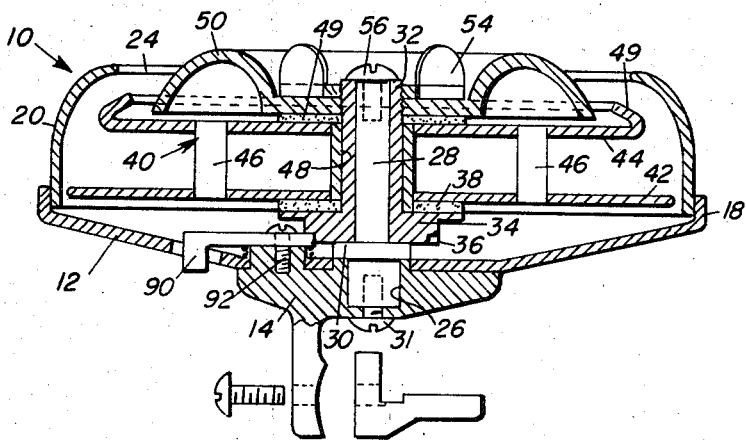
FIG. 4 is a cross-section along the line 4—4 of FIG. 2.

In conventional operation, the line can be wound or unwound by operation of the bell crank. A handle 51 is pivotally secured to the bell crank in a conventional fashion for ease of gripping. The upright position is shown in FIG. 1. A much greater casting distance can be obtained if the handle 60 is moved to its nesting position and the guide member moved to the casting position (FIGS. 2 and 3). Here the line is drawn off the reel without a rotation of the reel. Note the ratchet arm 90 which has an inner end which is spring-urged into engagement with the teeth 30. This latch assembly is secured to the base member 14 by way of a screw 92. The latch assembly is conventional in reels to lock the reel against rotation unless released.

In a general manner, while there has been disclosed an effective and efficient embodiment of the invention, it should be well understood that the invention is not limited to such an embodiment as there might be changes made in the arrangement, disposition, and form of the parts without departing from the principle of the present invention.

I claim:

1. A spinning reel for use with a fishing rod having a plurality of loops spaced along its length for guiding a fishing line during pay-out and haul-in in a direction generally parallel to the longitudinal axis of the fishing rod comprising, a saucer shaped base member, means affixing said base member to one end of said rod, a reel rotatably disposed in said base member about which said fishing line is wound, a member pivotally mounted to said base member and having a mid-section extending a substantial distance and over said reel, said member having guide means in said mid-section for receiving said line, an annular shroud affixed to said base and extending upwardly over the periphery of said reel, said shroud being arcuate in cross-section and having a central axial opening therein of a diameter slightly less than the diameter of said reel and being defined by a rounded free edge portion of said shroud, said free edge portion and the periphery of said reel defining an annular passageway, an annular bell crank member having an annular convex portion presenting a rounded, exterior surface extending from the side of said reel adjacent said shroud opening, said bell crank member being of a diameter less than that of said opening and projecting outwardly beyond the plane of said opening, and a handle for rotating said reel mounted on said crank for movement between retracted and extended positions.

2. A reel as defined in claim 1 and including a drag adjusting means within said shroud opening and extending upwardly beyond the plane of said free edge portion.

3. A reel as defined in claim 1 and including a latch assembly comprising a toothed member attached to said reel and a spring-loaded arm having one end engaging said latch and the other end extending through an opening in said base, and means pivotally mounting said arm whereby said one end can be disengaged by actuation of said other end.

* * * * *